United States Patent [19]

Endo et al.

[11] Patent Number: 5,073,898

[45] Date of Patent: Dec. 17, 1991

[54] COMMUNICATION DEVICE

[75] Inventors: Mamoru Endo; Masahiro Hamatsu, both of Tokyo, Japan

[73] Assignee: Clarion Co., Ltd., Tokyo, Japan

[21] Appl. No.: 472,089

[22] Filed: Jan. 30, 1990

[30] Foreign Application Priority Data

Feb. 7, 1989 [JP] Japan .................. 1-29539

[51] Int. Cl.$^5$ ........................... H04L 27/30
[52] U.S. Cl. ...................... 375/1; 329/315; 329/347; 375/80; 455/205; 455/334
[58] Field of Search ............ 375/1, 80; 380/34; 329/315, 347; 333/195; 364/724.12, 728.01, 819, 821; 455/205, 334

[56] References Cited

U.S. PATENT DOCUMENTS

| 4,179,658 | 12/1979 | Bitzer | 375/1 |
| 4,255,810 | 3/1981 | Solomon et al. | 375/1 |
| 4,860,307 | 8/1989 | Nakayama | 375/1 |
| 4,884,284 | 11/1989 | Nakayama | 375/1 |
| 4,926,440 | 5/1990 | Mikoshiba et al. | 375/1 |

Primary Examiner—Bernarr E. Gregory
Attorney, Agent, or Firm—Wallenstein, Wagner & Hattis, Ltd.

[57] ABSTRACT

A signal processing circuit utilizes a convolver correlating a reference carrier signal with a received signal. The correlator output is detected and then demodulated to output the signal information originally present on the carrier. For a conventional AM signal the reference carrier signal is applied at a frequency offset from the AM center frequency. When the carrier is an FM signal, the reference signal is applied at a frequency equal to the center frequency of the FM signal. Similar procedures are followed for a spread-modulated AM signal, and the reference signal is modulated with a suitably timed-reverse replica of the pseudo-noise code. A similar procedure is used to process spread-spectrum frequency shift keyed FM signals.

6 Claims, 11 Drawing Sheets

PN CODE

FIG. 8C

PN CODE

COMMUNICATION DEVICE

FIELD OF THE INVENTION

The present invention relates to a communication device using a convolver as a demodulator in particular for an analogue modulated signal.

BACKGROUND OF THE INVENTION

Heretofore no example is known, in which a convolver is used as a demodulator in an AM or FM receiver.

OBJECT OF THE INVENTION

The object of the present invention is to provide an AM or FM communication device using a convolver as a demodulator.

SUMMARY OF THE INVENTION

In order to achieve the above object, a communication device according to the present invention is characterized in that it comprises a reference signal generator for generating a reference carrier signal having a frequency which is nearly equal to or somewhat deviated from the central frequency of an AM or FM modulated received signal; a surface acoustic wave convolver correlating the reference carrier signal with the received signal; means for detecting a correlated output signal outputted by the convolver; and demodulating means for demodulating an output signal thus detected to obtain the information signal.

The present invention may include further a communication device consisting of a transmitter provided with means for spread-modulating an AM or FM modulated carrier signal to be transmitted by using a pseudo-noise code and a receiver comprising a spread-modulating means for spread-modulating a reference carrier signal having a frequency. which is nearly equal to or somewhat deviated from the central frequency of an AM or FM modulated received signal by using a reference pseudo-noise code inverted in time with respect to the pseudo-noise code stated above; a surface acoustic wave convolver for correlating a spread-modulated signal thus received; means for detecting a correlated output signal outputted by the convolver; and demodulating means for demodulating an output signal thus detected to obtain information signal.

By the method using the spectrum diffusion, the demodulating processes by the carrier wave and the pseudo-noise code (PN code) are performed asynchronously and for this reason the repetition speed of the PN code is sufficiently greater than the frequency of information signal.

BRIEF DESCRIPTION OF THE DRAWINGS

FIGS. 6(a) to 6(h) and 8(a) to 8(f) are schemes showing waveforms at various parts of the devices indicated in FIGS. 1A, 1B and 7A, 7B, respectively.

DETAILED DESCRIPTION

Figure 1A:
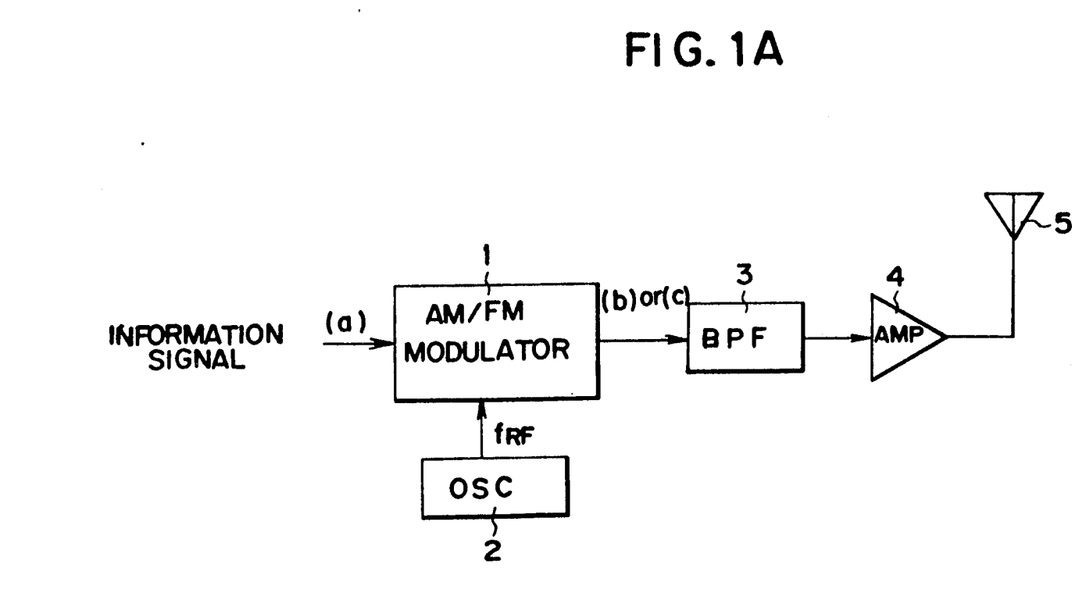
FIGS. 1A and 1B are block diagrams showing the construction of a communication device according to the present invention.
Figure 1B:
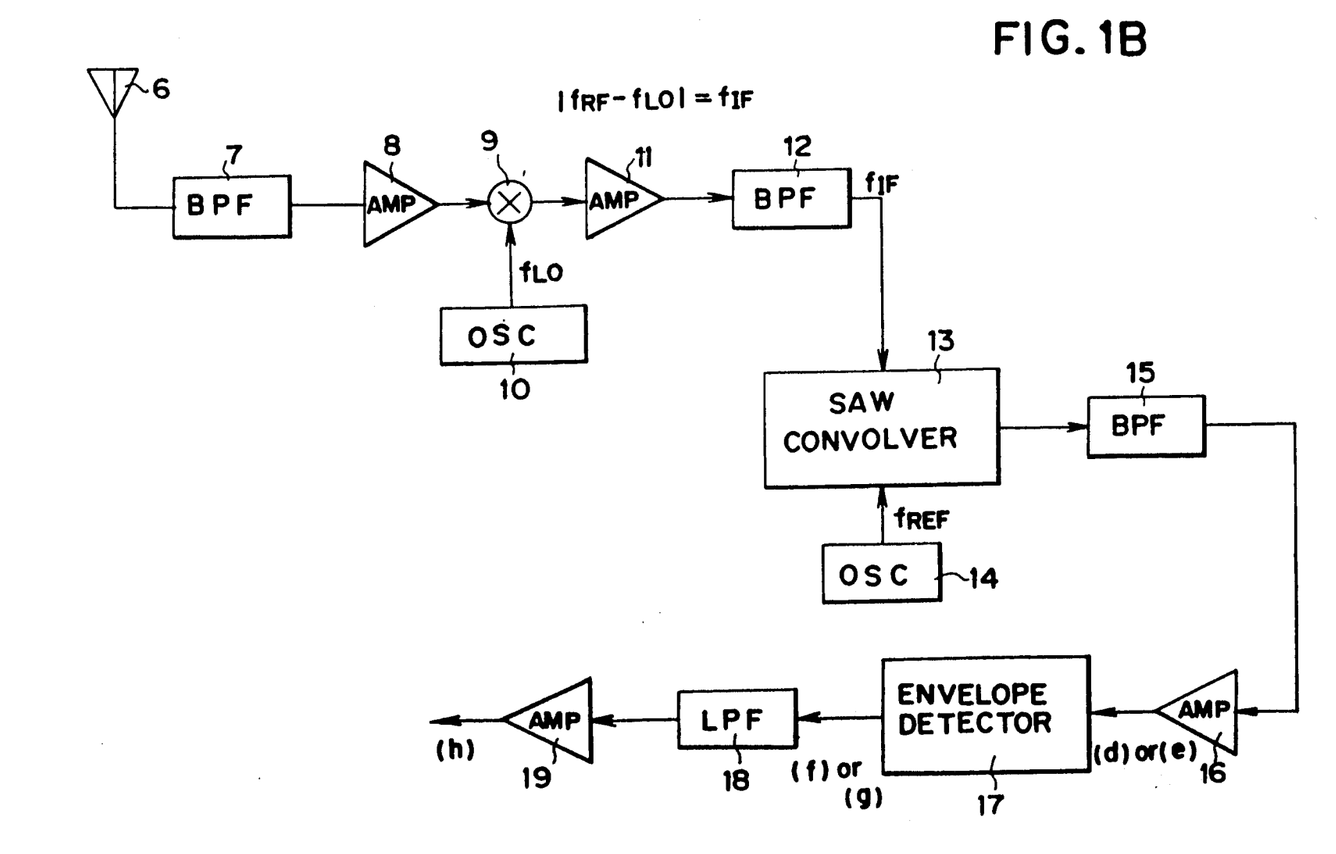

FIGS. 1A and 1B are block diagrams showing the construction of a communication device according to the present invention, FIG. 1A indicating a transmitter, FIG. 1B a receiver, in which reference numeral 1 is an AM/FM modulator; 2 is an oscillator; 3 is a band pass filter; 4 is an amplifier; 5 is a transmitting antenna; 6 is a receiving antenna; 7 is a band pass filter; 8 is an amplifier; 9 is a mixer; 10 is an oscillator; 11 is an amplifier; 12 is a band pass filter; 13 is an SAW convolver; 14 is an oscillator; 15 is a band pass filter; 16 is an amplifier; 17 is an envelope detector; 18 is a low pass filter; and 19 is an amplifier.

The operation of the embodiment described above will be explained below.

At first, the in- and output characteristics of the convolver will be explained.

Figure 2:
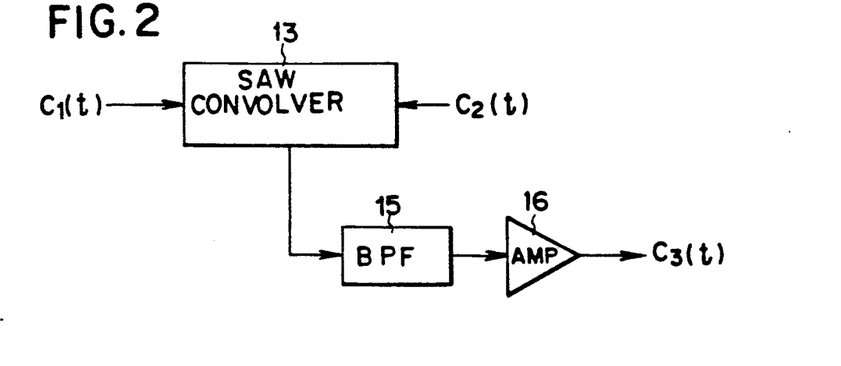
FIG. 2 is a block diagram for explaining in- and output characteristics of a convolver.

In a convolver system as indicated in FIG. 2, supposing that the received signal input $C_1(t)$ and the reference signal input $C_2(t)$ are sinusoidal signals as given by;

$$C1(t) = A1(t) \cdot \cos(2\pi \cdot f\,IF \cdot t) \quad (1)$$

$$C2(t) = A2(t) \cdot \cos(2\pi \cdot f\,REF \cdot t) \quad (2)$$

the correlated output signal $C_3(t)$ is also a sinusoidal signal as expressed by:

$$C3(t) = A3(t, \Delta f) \cdot \cos(2\pi \cdot f\,out \cdot t) \quad (3)$$

where $$A3(t, \Delta f) = a \cdot A1(t) \cdot A2(t) \cdot B(\Delta f) \quad (4)$$

$a$: proportionality constant, $$B(\Delta f) = \frac{\sin(\pi \cdot \Delta f \cdot \tau)}{\pi \cdot \Delta f \cdot \tau}$$

$\Delta f = f\,IF - f\,REF$
$\tau$: delay time in the convolver, and $$f\text{out} = f\text{IF} + f\text{REF} \quad (5)$$

That is, from Equation (5), the carrier frequency $f_{OUT}$ of the correlated output signal is the sum of the carrier frequencies of the inputted signals ($=F_{IF}+f_{REF}$). Further, from Equation (4), concerning the amplitude $A_3(t,\Delta f)$ of the correlated output signal, it can be seen that (1) $A_3(t,\Delta f)$ is proportional to the amplitude $A_1(t)$ of the received signal, and (2) $A_3(t,\Delta f)$ is proportional to $B(\Delta f)$, that is, it has attenuation characteristics, which are proportional to $\sin x/x$ (where $x = \pi \cdot \Delta f \cdot \tau$) for a difference in the carrier frequency between the received signal and the reference signal $\Delta f$ ($=f_{IF}-f_{REF}$).

Figure 3:
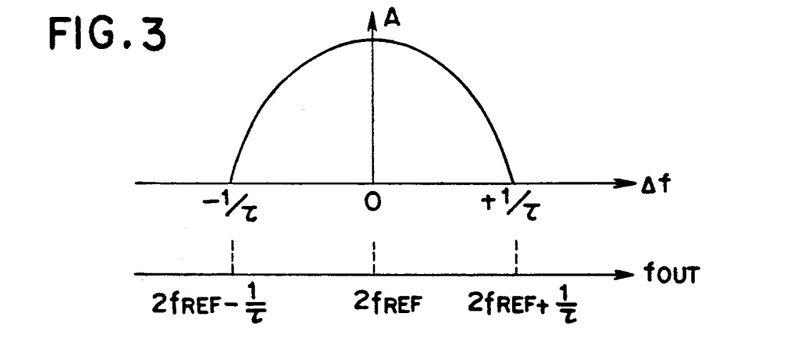
FIG. 3 is a scheme indicating amplitude characteristics of a correlated output signal.

FIG. 3 shows amplitude characteristics of the correlated output signal, when it is supposed that $A_1(t)$ and $A_2(t)$ are constant, that is, $$A_3(t, \Delta f) = A_3(\Delta f) \quad (6)$$
$$= \beta \cdot B(\Delta f)$$

$\beta$: proportionality constant.

Figure 4:
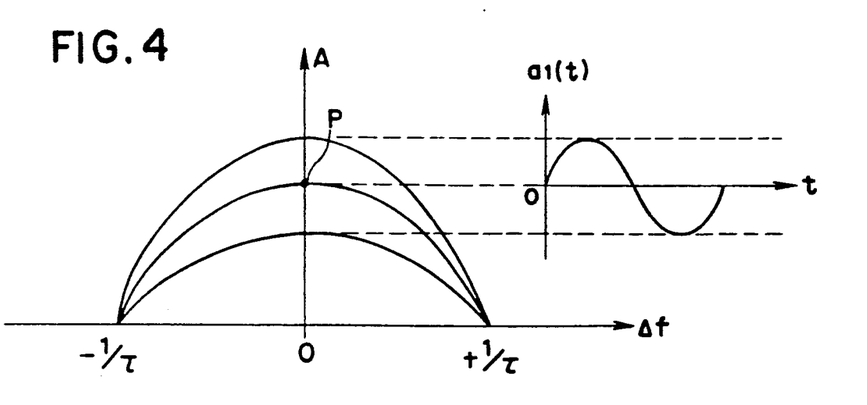
FIG. 4 is a scheme showing the principle for using the convolver as an AM demodulator.

Now the result stated above concerning the amplitude $A_3(t,\Delta f)$ of the correlated output signal of the signals expressed by Equation (1) and (2) suggests for the application of the convolver that:

(1') It is set so that $\Delta f=0$, that is, $f_{IF}=f_{REF}$. In this case, the correlated output signal has the greatest response. Further, it is set so that the amplitude $A_2(t)$ of the reference signal is constant. At this time, supposing that the amplitude $A_1(t)$ of the received signal is expressed by $A_1(t)=1+a_1(t)$, it is possible to obtain the signal component $a_1(t)$ in the received signal by demodulating the correlated output signal. That is, it is possible to use the convolver as the AM demodulator. FIG. 4 shows the principle therefor, in which P indicates the working point of the convolver.

Figure 5:
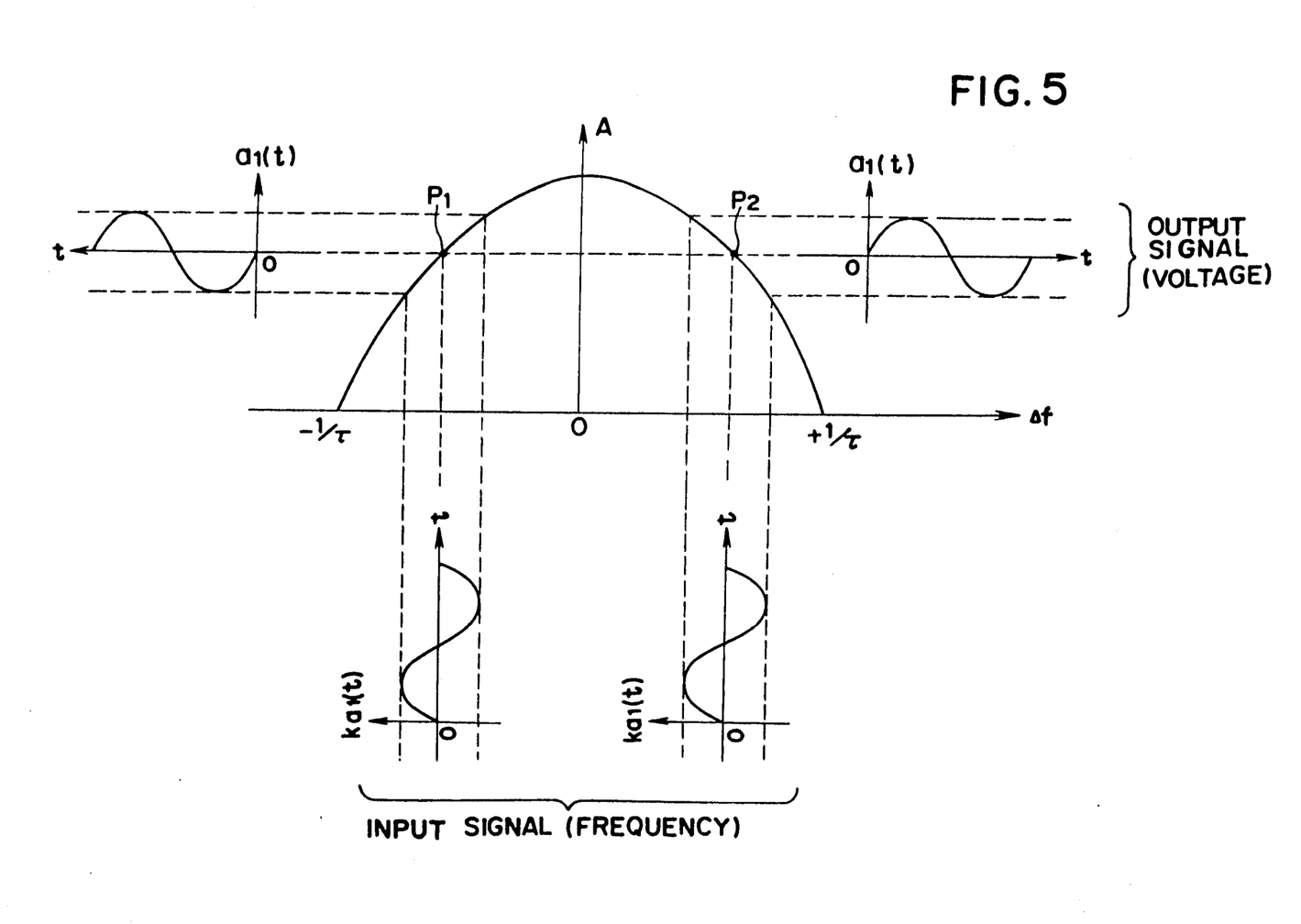
FIG. 5 is a scheme showing the principle for using the convolver as an FM demodulator.

(2') It is set so that $A_2(t)$ is constant and an FM modulated signal $C_1'(t)$ given by;

$$C_1'(t) = \cos[\int 2\pi(f_{IF} + ka_1(t))dt] \quad (7)$$

k: voltage-frequency conversion coefficient, is inputted as the received signal. $f_{IF}$ is so set that $\Delta f$ is between 0 and $+1/\tau$ or between 0 and $-1/\tau$.

At this time, it is possible to obtain the signal component $a_1(t)$ in the received signal by demodulating the correlated output signal (the convolver is used as a frequency-voltage converter). That is, it is possible to use the convolver as an FM demodulator. FIG. 5 shows the principle therefor, in which $P_1$ and $P_2$ indicate the working points of the convolver.

FIGS. 6(a) to 6(h) show waveforms at various parts of the device indicated in FIGS. 1A and 1B.

Figure 6A:
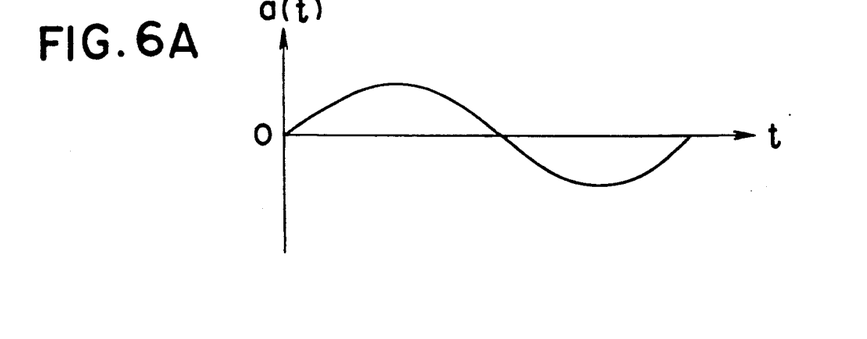
Figure 6B:
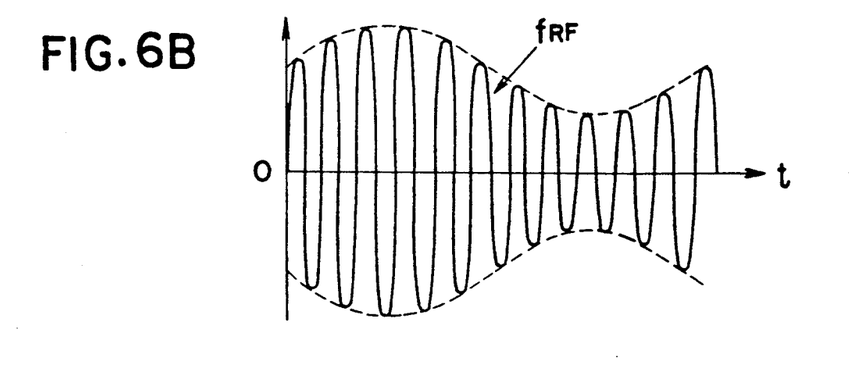
Figure 6C:
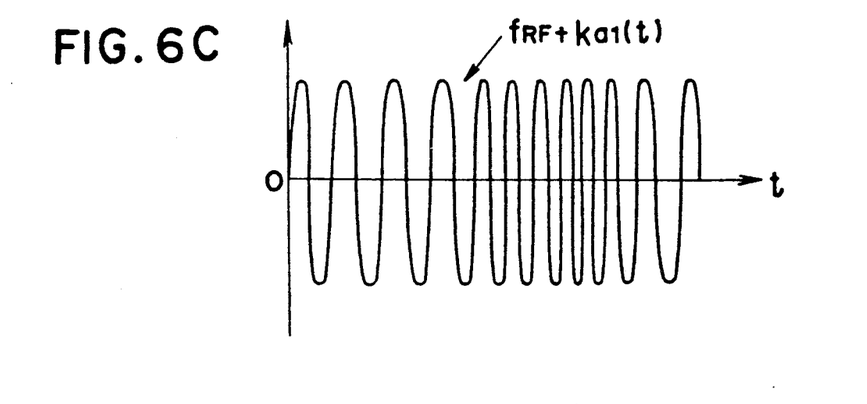

In FIGS. 1A and 1B, the transmitter AM or FM modulates an RF carrier signal (frequency $f_{RF}$) with the information signal (FIG. 6(a)) to transmit it (FIG. 6(b) or 6(c)). In FIGS. 6(a) to 6(h), the ordinate represents the amplitude of the signals.

In the receiver, the central frequency of the received signal is frequency-converted into an intermediate frequency $f_{IF}$ by means of the local oscillator 10 (frequency $f_{LO}$), which is inputted in one of the input ports of the convolver.

On the other hand, the reference carrier signal (frequency $f_{REF}$) is inputted in the other input port of the convolver.

Further, the value of $f_{LO}$ is so set that $f_{IF}=$of $_{REF}$ for AM and $f_{IF}=f_{REF}+\frac{1}{2}\tau$ for FM.

Figure 6D:
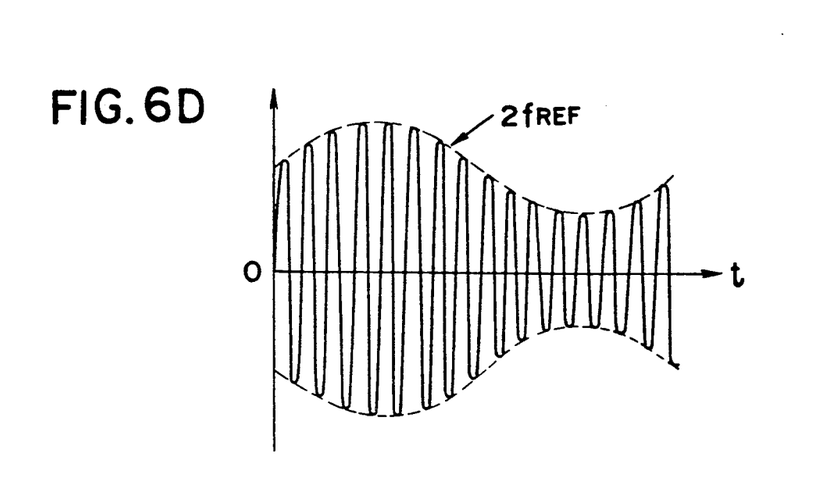
Figure 6E:
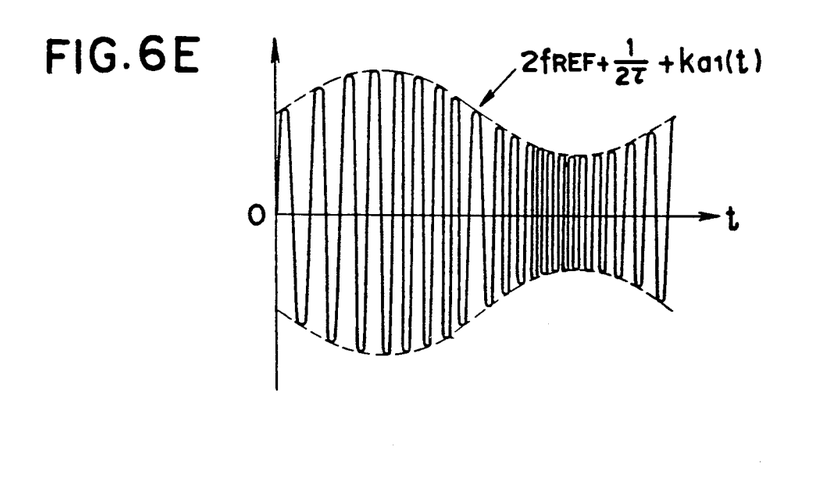
Figure 6F:
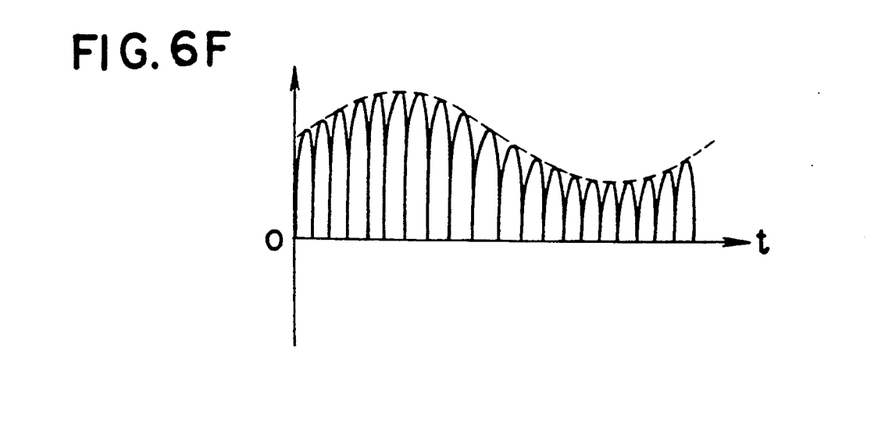
Figure 6G:
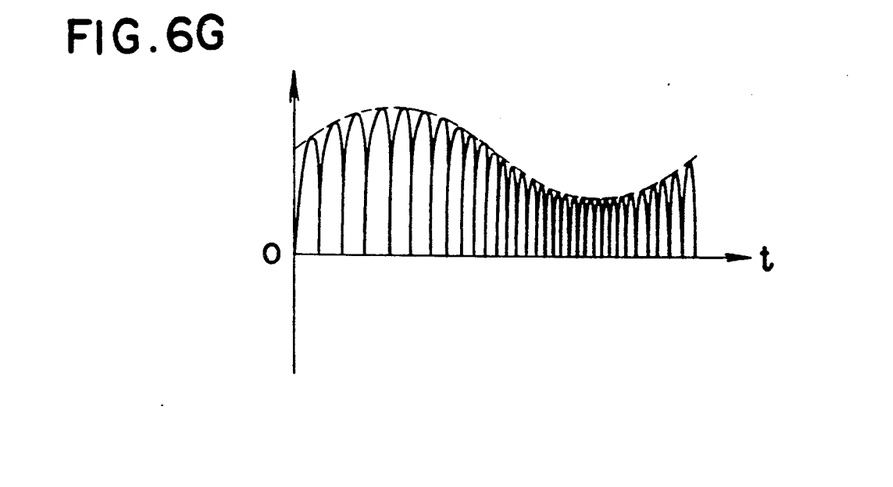
Figure 6H:
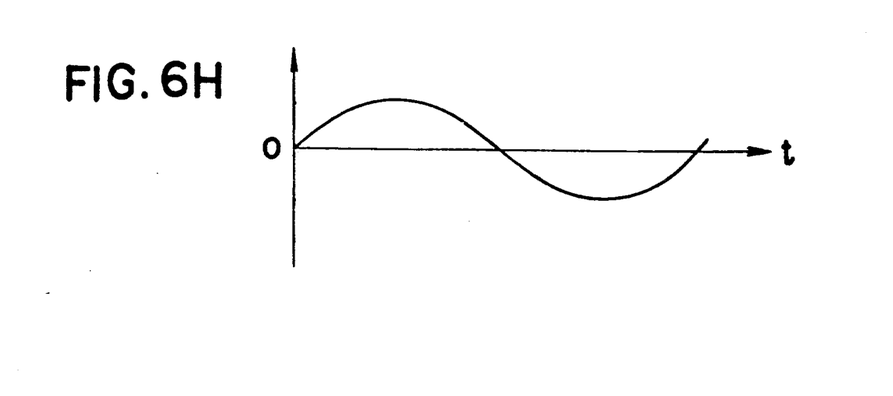

At this time, the correlated output signal is as indicated in FIG. 6(d) or 6(e). The demodulated signal (FIG. 6(h)) corresponding to the information signal $a_1(t)$ is obtained by envelope-detecting it (FIG. 6(f) or 6(g)) and making it pass through the low pass filter 18 to shape the waveform thereof.

Figure 7A:
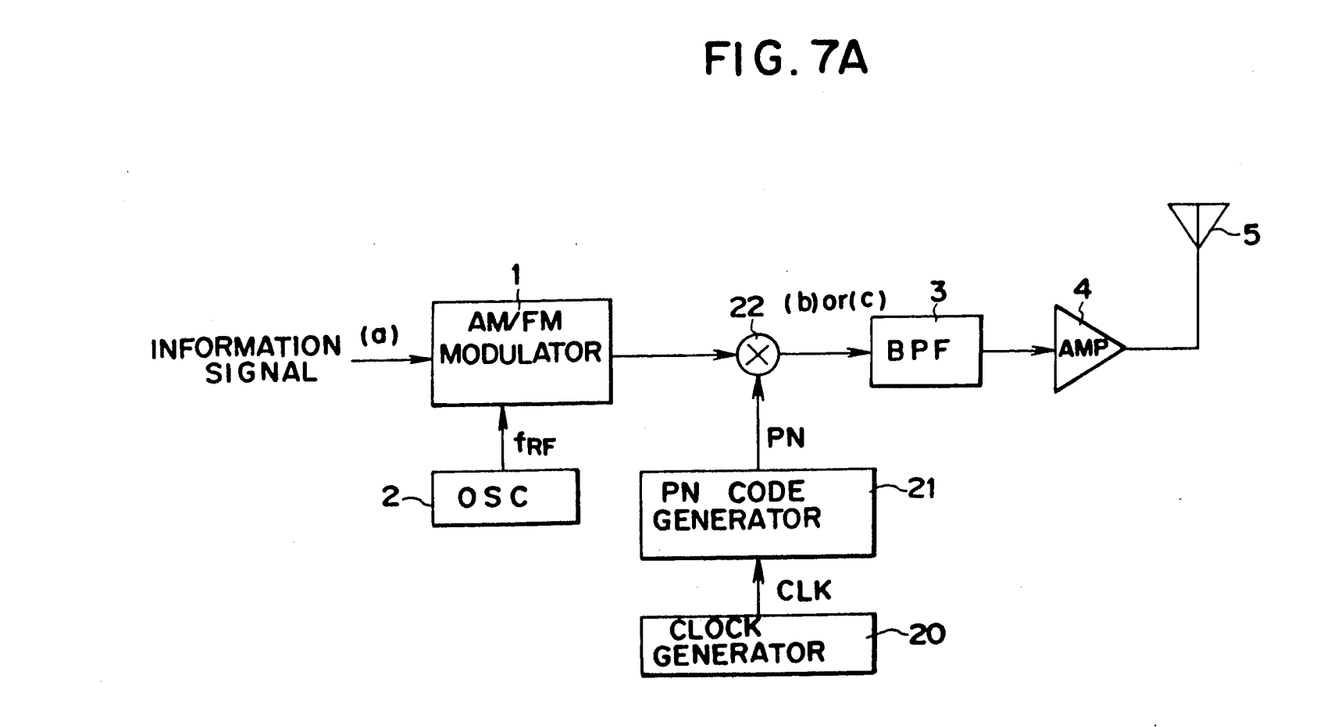
FIGS. 7A and 7B are block diagrams showing the construction of a communication device, which is another embodiment of the present invention, in which a signal diffusion-modulated by using the PN code is transmitted.
Figure 7B:
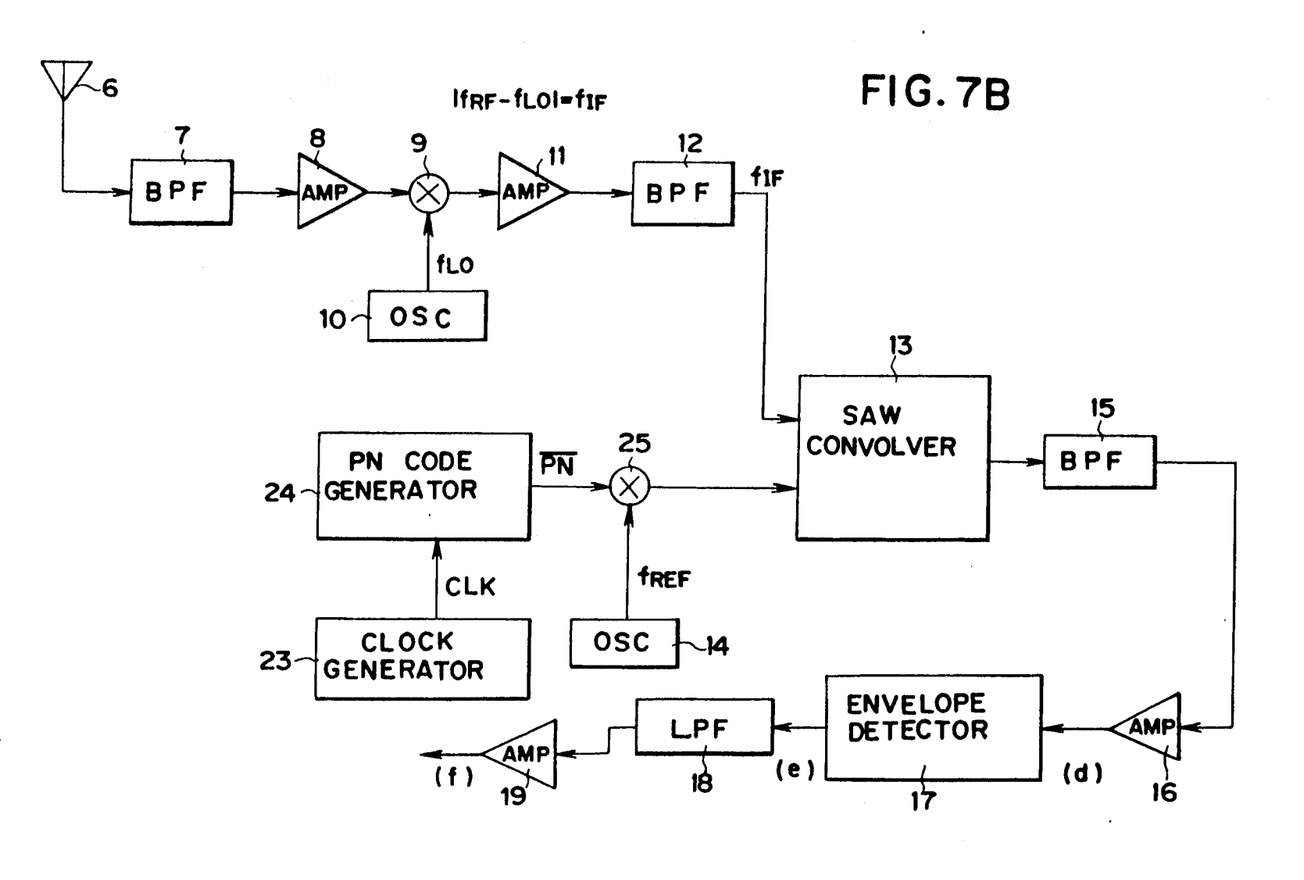

FIGS. 7A and 7B are block diagrams showing the construction of a communication device, which is another embodiment of the present invention, in which a signal spread-modulated by using the PN code is transmitted. In the figures, the reference numerals used in common in FIGS. 1A and 1B represent items identical or corresponding to those indicated in FIGS. 1A and 1B; 20 and 23 are clock generators; 21 and 24 are PN code generators and 22 and 25 are mixers. FIGS. 8(a) to 8(f) show waveforms at various parts of the device indicated in FIGS. 7A and 7B, in which the ordinate represents the amplitude of the signal.

Figure 8A:
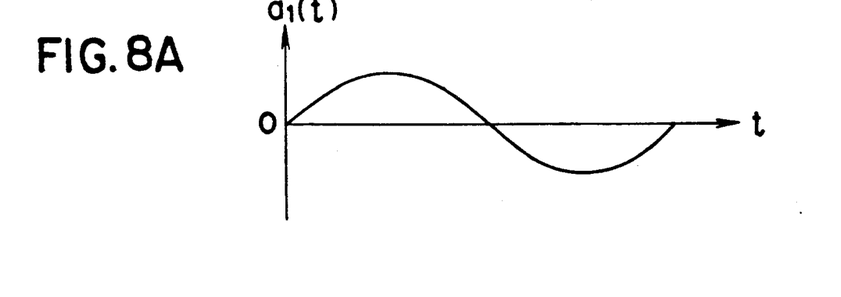
Figure 8B:
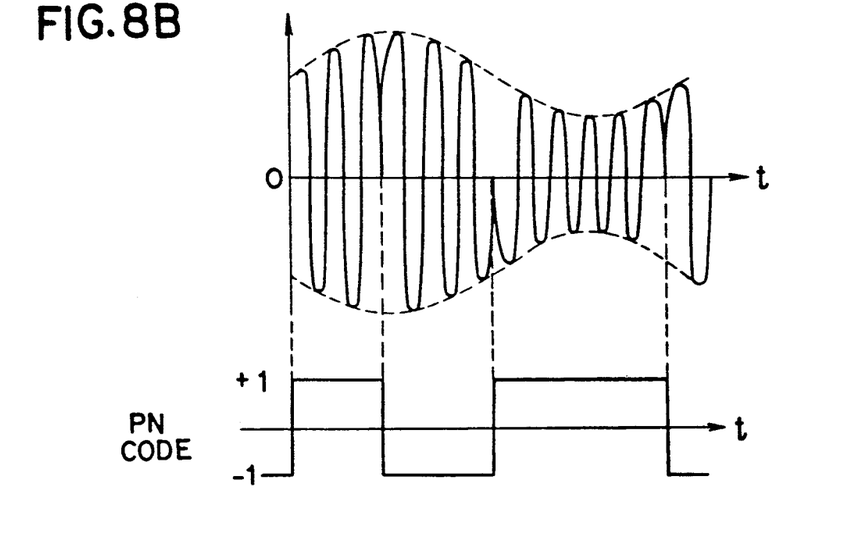
Figure 8C:
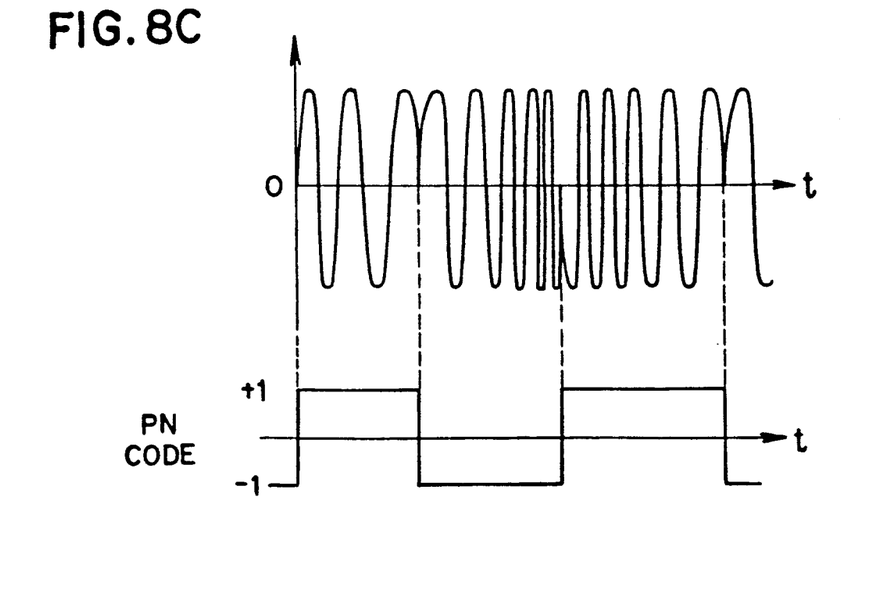

In this embodiment, in the transmitter (FIG. 7A), the RF carrier signal (frequency $f_{RF}$) is AM or FM modulated with the information signal (FIG. 8(a)) and thereafter it is further BPSK (binary phase-shift keying) modulated (FIG. 8(b) or 8(c)) with the PN code (PN) to be transmitted.

In the receiver (FIG. 8B), the central frequency of the received signal is frequency-converted into an intermediate frequency $f_{IF}$ by means of the local oscillator 10 (frequency $f_{LO}$), which is inputted in one of the input ports of the convolver.

On the other hand, the reference carrier signal (frequency $f_{REF}$), which is BPSK modulated with the PN code ($\overline{PN}$) inverted in time with respect to that used on the transmitter side, is inputted in the other input port of the convolver.

Further, the value of $f_{LO}$ is so set that $f_{IF}=f_{REF}$ for AM and $f_{IF}=f_{REF}+\frac{1}{2}\tau$ for FM.

Figure 8D:
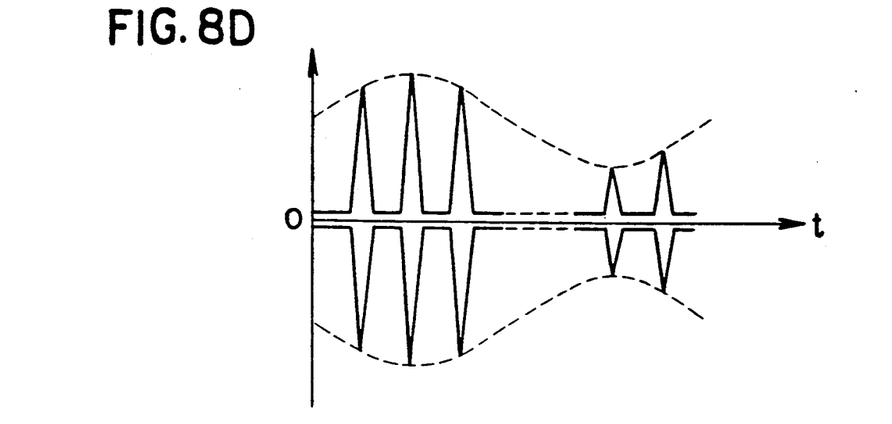
Figure 8E:
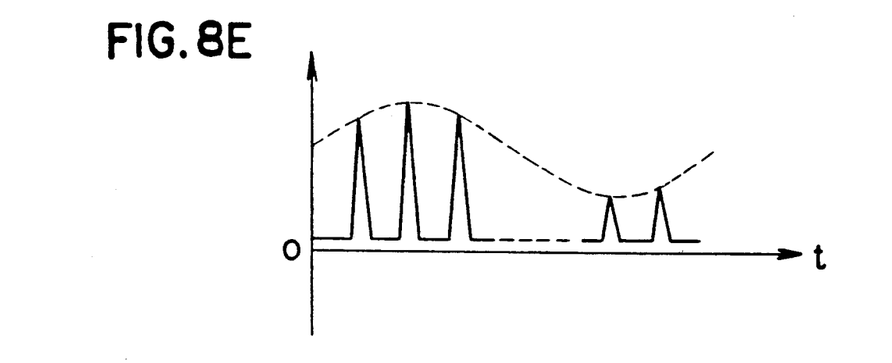
Figure 8F:
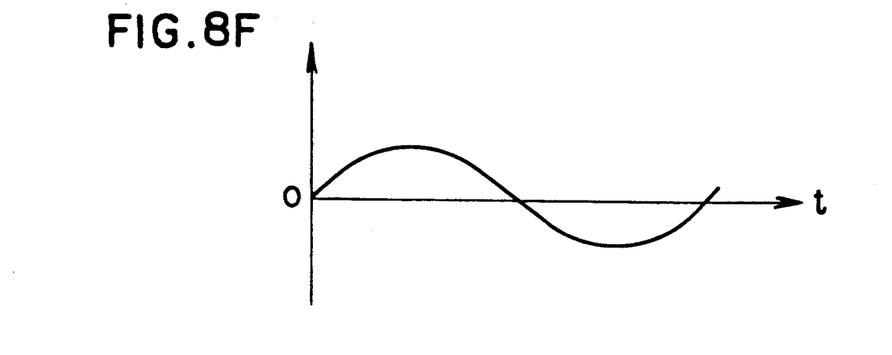

At this time, the correlated output signal is as indicated in FIG. 8(d). The demodulated signal (FIG. 8(f)) corresponding to the information signal $a_1(t)$ is obtained by envelope-detecting it (FIG. 8(e)) and making it pass through the low pass filter 18 to shape the waveform thereof.

As explained above, according to the present invention, it is possible to obtain a communication device using a convolver as a demodulator for an AM or FM modulated signal.

While particular embodiment of the invention have been shown and described, it will be obvious to those skilled in the art that various changes and modifications may be made without departing from the present invention in its broader aspect.

What is claimed is:

1. A communication circuit comprising:

a local reference signal generator for generating a reference carrier signal having a constant period and time invariant phase at a frequency which is at least approximately equal to the central frequency of a received signal amplitude modulated with information;

surface acoustic wave convolver means for performing a convolution integration of said reference carrier signal and said received amplitude modulated signal so as to produce a correlated output signal correlating said reference carrier signal with said received amplitude modulated signal, said correlated signal being an a.c. pulse train amplitude modulated by said information and having a center frequency governed by said reference carrier frequency.

envelope detector means for envelope-detecting said correlated output signal outputted by said convolver means as a train of pulses of common polarity varying in amplitude so as to have an envelope replicating said information; and demodulating means for demodulating envelope-detected signals from said envelope detector means to obtain said information signal by filtering said envelope detector output signal to remove frequency components lying above those of said information signal.

2. A communication circuit comprising:

a local reference signal generator for generating a reference carrier signal having a constant period and time invariant phase at a frequency which is offset from the central frequency of received signal frequency modulated with information;

surface acoustic wave convolver means for performing a convolution integration of said reference carrier signal and said received frequency modulated signal so as to produce a correlated output signal correlating said reference carrier signal with said received frequency modulated signal, said correlated signal being an a.c. pulse train amplitude modulated by said information and having a center frequency governed by said reference carrier frequency;

envelope detector means for envelope-detecting said correlated output signal outputted by said convolver means as a train of pulses of common polarity varying in amplitude so as to have an envelope replicating said information; and demodulating means for demodulating envelope-detected signals from said envelope detector means to obtain said information signal by filtering said envelope detector output signal to remove frequency components above those of said information signal.

3. A communication receiver circuit comprising:

means for receiving a spread-modulated signal provided by spread-modulating a carrier signal amplitude modulated with information signals by using a pseudo-noise code;

spread-modulating means for spread-modulating a locally generated reference carrier signal having a center frequency which is at least approximately equal to the central frequency of a spread-modulated signal thus received by using a reference pseudo-noise code inverted in time with respect to said pseudo-noise code;

surface acoustic wave convovler means for performing a convolution integration of sad received spread-modulated signal and said spread-modulated reference carrier so as to produce a correlated output signal correlating said received spread-modulated signal with said spread-modulated reference carrier;

envelope detector means for envelope-detecting said correlated output signal outputted by said convolver means so as to produce output signals in the form of a series of pulses of common polarity and varying height, the peaks of successive pulses tracing out in time the information contained in said received carrier; and demodulating means for demodulating envelope-detected signals from said envelope detector means to obtain said information signal by filtering said envelope detector output signals to remove frequency components lying above those of said information signals.

4. The communication receiver circuit according to claim 3 combined with a transmitter provided with means for spread-modulating an AM modulated carrier by using a pseudo-noise code to further modulate said carrier.

5. A communication receiver circuit comprising:

means for receiving a spread-modulated signal provided by spread-modulating a carrier signal frequency modulated with information signals by using pseudo-noise code;

spread-modulating means for spread-modulating a locally generated reference carrier signal having a frequency which is offset from the central frequency of said spread-modulated signal thus received by using a reference pseudo noise code inverted in time with respect to said pseudo-noise code;

surface acoustic wave convolver means for performing a convolution integration of said received spread-modulated signal and said spread-modulated reference carrier so as to produce a correlated output signal correlating said received spread-modulated signal with said spread-modulated reference carrier;

envelope detector means for envelope-detecting said correlated output signal outputted by said convolver means so as to produce a output signals in the form of series of pulses of common polarity and varying height, the peaks of successive pulses tracing out in time the information contained in said received carrier; and demodulating means for demodulating envelope-detected signals thus detected to obtain said information signal by filtering said envelope detector output signals to remove frequency components lying above those of said information signals.

6. The communication receiver circuit according to claim 5 combined with a transmitter provided with means for spread-modulating an FM modulated carrier by using a pseudo-noise code to further modulate said carrier.

* * * * *